United States Patent
Pan et al.

(10) Patent No.: US 10,637,272 B2
(45) Date of Patent: Apr. 28, 2020

(54) WIRELESS CHARGING SYSTEMS AND METHODS WITH ADAPTIVE EFFICIENCY OPTIMIZATION

(71) Applicant: Shenzhen Yichong Wireless Power Technology Co. Ltd., Shenzhen, Guangdong (CN)

(72) Inventors: Siming Pan, San Jose, CA (US); Dawei He, Burlingame, CA (US); Tun Li, San Jose, CA (US)

(73) Assignee: SHENZHEN YICHONG WIRELESS POWER TECHNOLOGY CO. LTD, Shenzhen (CN)

( * ) Notice: Subject to any disclaimer, the term of this patent is extended or adjusted under 35 U.S.C. 154(b) by 204 days.

(21) Appl. No.: 15/591,446

(22) Filed: May 10, 2017

(65) Prior Publication Data

US 2017/0338686 A1 Nov. 23, 2017

Related U.S. Application Data

(60) Provisional application No. 62/339,056, filed on May 19, 2016.

(51) Int. Cl.
*H02J 50/80* (2016.01)
*H02J 50/10* (2016.01)
*H02J 7/02* (2016.01)

(52) U.S. Cl.
CPC .............. *H02J 7/025* (2013.01); *H02J 50/10* (2016.02); *H02J 50/80* (2016.02)

(58) Field of Classification Search
CPC ...................................... H02J 7/00; H02J 7/02
See application file for complete search history.

(56) References Cited

U.S. PATENT DOCUMENTS

| | | | |
|---|---|---|---|
| 2008/0048837 A1* | 2/2008 | Montgomery | G06K 19/0716 340/10.51 |
| 2013/0020862 A1* | 1/2013 | Miller | H02J 5/005 307/9.1 |
| 2014/0015330 A1* | 1/2014 | Byun | H02J 5/005 307/104 |
| 2015/0177293 A1* | 6/2015 | McFarthing | H02J 50/10 340/870.3 |
| 2016/0056640 A1* | 2/2016 | Mao | H02J 50/12 307/104 |
| 2018/0269726 A1* | 9/2018 | Abdolkhani | H02M 3/33507 |

* cited by examiner

*Primary Examiner* — Jared Fureman
*Assistant Examiner* — Emmanuel Dominique
(74) *Attorney, Agent, or Firm* — Sheppard Mullin Richter & Hampton LLP

(57) ABSTRACT

A method for adaptively optimizing wireless charging efficiency is disclosed. The method may comprise providing an input power to a power transmitter, the power transmitter comprising a transmitter-side coil wirelessly coupled to a receiver-side coil of a power receiver, determining, at the power receiver, a real power transferred from the power transmitter, transmitting information associated with the determined real power to the power transmitter through the coupling between the receiver-side coil and the transmitter-side coil, and adjusting, at the power transmitter, the input power in response to determining, according to the transmitted information, that the real power differs from an expected power corresponding to the input power by over a first threshold, causing the real power to tune towards the expected power.

16 Claims, 4 Drawing Sheets

WIRELESS CHARGING SYSTEMS AND METHODS WITH ADAPTIVE EFFICIENCY OPTIMIZATION

CROSS REFERENCE TO RELATED APPLICATIONS

This application is based on and claims priority to U.S. Provisional Application No. 62/339,056, filed May 19, 2016, entitled "WIRELESS CHARGING SYSTEMS AND METHODS WITH ADAPTIVE EFFICIENCY OPTIMIZATION," the entire contents of which are incorporated herein by reference.

TECHNICAL FIELD

The disclosure relates generally to a wireless charging method and apparatus, particularly, to a wireless charging method and apparatus with adaptive efficiency optimization.

BACKGROUND

Wireless charging is an evolving technology that may bring a new level of convenience of charging millions of electronic devices. In a wireless charging system, in particular, in an inductive wireless charging system, energy is transferred from a power transmitter, through magnetic coils coupled to the power transmitter, to one or multiple power receivers. Charging efficiency, which is the ratio of received power over transmitted power, is the most critical parameter in wireless charging. Improving the charging efficiency will effectively reduce the energy wasted during transmission, prevent heat discharges or over-voltage damages of the charging and to-be-charged devices. Also the improved efficiency could eliminate unnecessary electromagnetic radiations, avoiding potential influences on human's health.

There are mainly two approaches for efficiency optimization: (1) hardware approach, by using high efficiency components such as integrated circuits (ICs); (2) software approach, by tuning input power based on an optimization method. Most of the Qi protocol based wireless-charging systems in today's market rely on the hardware approach, and only tune to achieve a stable output voltage at the receiver rectifier. These systems use a power transmission pad and a compatible receiver in a portable device. In operation, a to-be-charged device is placed on top of the power transmission pad, which charges it via resonant inductive coupling. The hardware approach is greatly limited by cost, product design, and IC technology. On software approach, wireless charging systems based on AirFuel protocol uses Bluetooth Low Energy (BLE) to provide feedback information from a power receiver to a transmitter, so power transmitter can calculate a current efficiency and tune the input power when receiving the feedback packet. However, the BLE feedback packet interval is large due to the low energy characteristics, and the tuning step is small because of the inconsistency of receiver (RX) load condition under different input power, so this mechanism takes a long time to converge to good efficiency.

Therefore, it is desirable to have a wireless charging system with optimal charging efficiency, fast convergence time, and reliable output power.

SUMMARY

One aspect of the present disclosure is directed to a method for adaptively optimizing wireless charging efficiency. The method may comprise providing an input power to a power transmitter, the power transmitter comprising a transmitter-side coil wirelessly coupled to a receiver-side coil of a power receiver, determining, at the power receiver, a real power transferred from the power transmitter, transmitting information associated with the determined real power to the power transmitter through the coupling between the receiver-side coil and the transmitter-side coil, and adjusting, at the power transmitter, the input power in response to determining, according to the transmitted information, that the real power differs from an expected power corresponding to the input power by over a first threshold, causing the real power to tune towards the expected power.

Another aspect of the present disclosure is directed to a system for adaptively optimizing wireless charging efficiency. The system may comprise a power transmitter configured to receive an input power, the power transmitter comprising a transmitter-side coil wirelessly coupling to a receiver-side coil, and a power receiver comprising the receiver-side coil. The power receiver may be configured to: determine a real power transferred from the power transmitter, and transmit information associated with the determined real power to the power transmitter through the coupling between the receiver-side coil and the transmitter-side coil. The power transmitter may be further configured to adjust the input power in response to determining, according to the transmitted information, that the real power differs from an expected power corresponding to the input power by over a first threshold, causing the real power to tune towards the expected power.

It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

Figure 1:
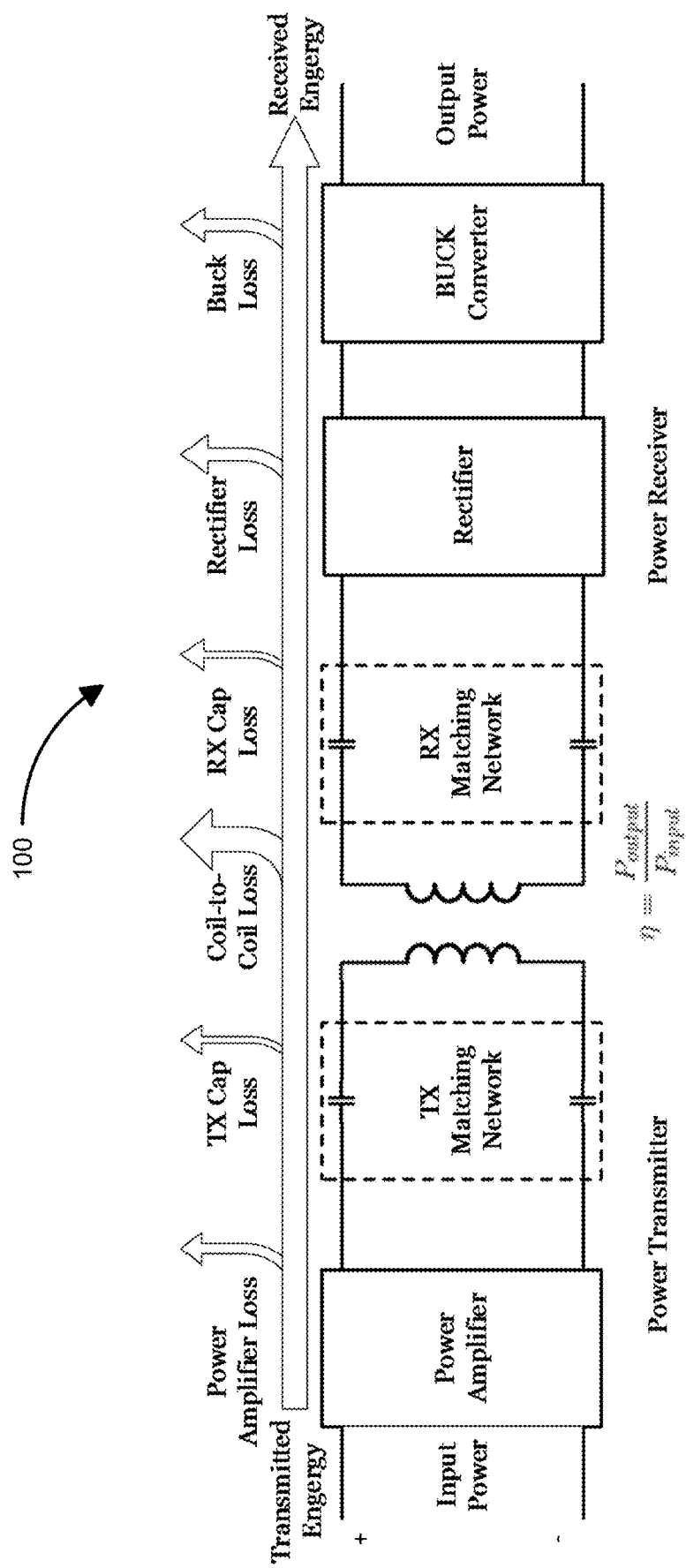
FIG. 1 is a diagram of a wireless charging system, according to one exemplary embodiment.

FIG. 1 shows a wireless charging system. As shown in FIG. 1, the wireless charging system includes a transmitter side and a receiver side. The transmitter side and receiver side are coupled by coils therebetween. In one exemplary embodiment, the transmitter side includes input nodes (+ and −), a power amplifier, and a transmitter matching network (TX matching network). The receiver side includes a receiver matching network (RX matching network), a rectifier, and a buck converter. The power are input at the input nodes of the transmitter side, wirelessly transmitted through the coils to the receiver side, and applied to a load at the output. As shown in FIG. 1, at each stage, there are power losses, for example, capacitor losses (cap losses) and heat losses.

Figure 2:
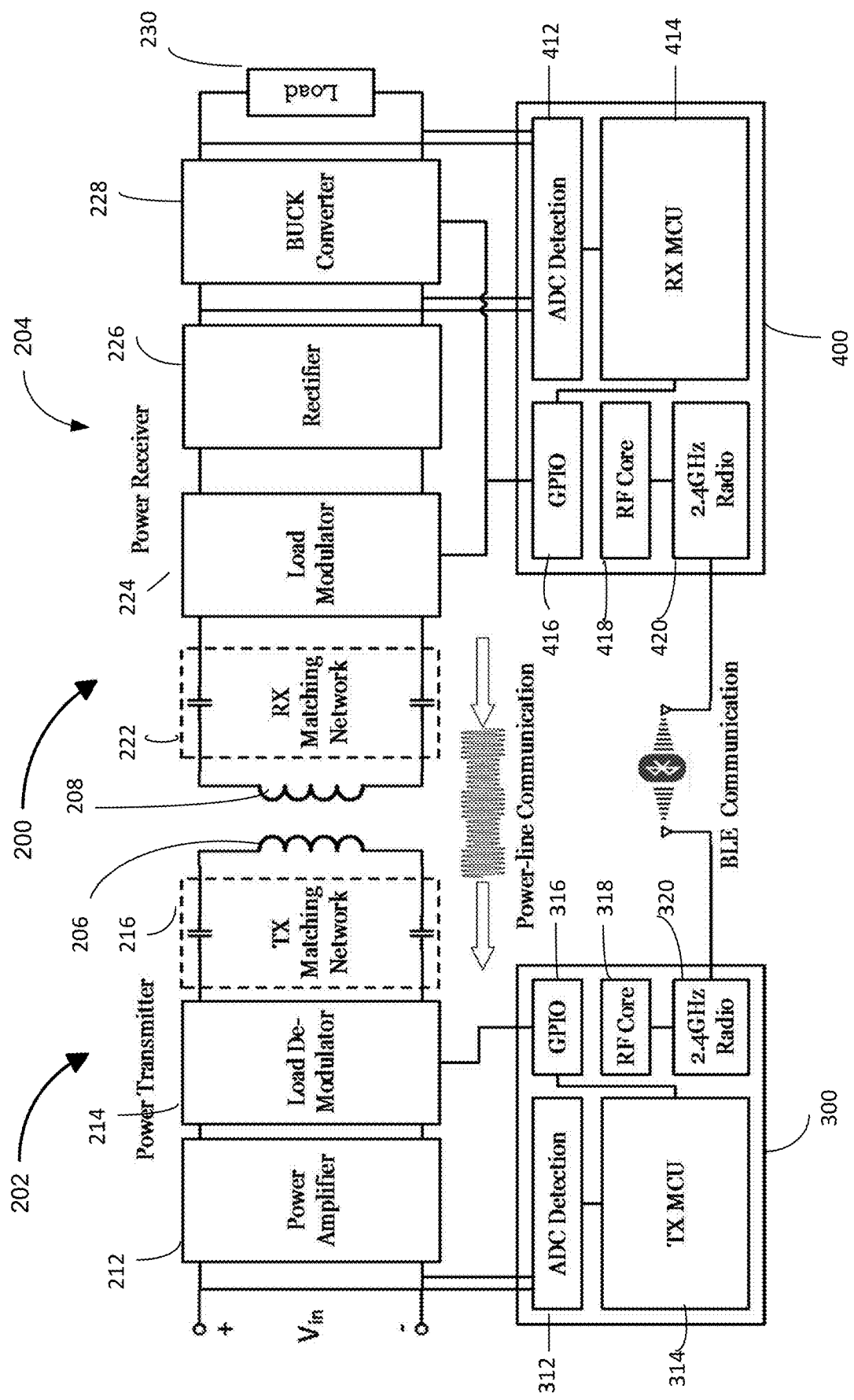
FIG. 2 is a diagram of a wireless charging system, according to another exemplary embodiment.

FIG. 2 shows a wireless charging system 200 according to some other embodiments of the present disclosure. As shown in FIG. 2, the wireless charging system 200 includes a transmitter side 202 and a receiver side 204. The transmitter side 202 and receiver side 204 are coupled by coils 206, 208 therebetween. In one exemplary embodiment, the transmitter side 202 includes input nodes (+ and −), a power amplifier 212, a load demodulator 214, and a transmitter matching network 216. The receiver side 204 includes a receiver matching network 222, a load modulator 224, a rectifier 226, a buck converter 228, and a load 230. The transmitter side 202 may be implemented in a charging device. The receiver side 204 may be implemented in a consumer electronic device, such as a cell phone, headset, watch, tablet device, laptop, electronic brush, car, or any other consumer electronic devices that may be wirelessly charged. Alternatively, the receiver side may be implemented as a stand-along charging device for a user to attach to a consumer electronic device. For example, a user can attach an electronic device as the load 230 as shown in FIG. 2.

In addition, as shown in FIG. 2, the transmitter side 202 further includes a transmitter control block 300, and the receiver side 204 also includes a receiver control block 400. The transmitter control block 300 includes an analog-to-digital detection circuit 312, a transmitter micro controller unit (TX MCU) 314, a general purpose input and output (GPIO) 316, a radio frequency circuit (RF Core) 318, and a radio transceiver 320. The receiver control block 400 includes an analog-to-digital detection circuit 412, a receiver micro controller unit (RX MCU) 414, a general purpose input and output (GPIO) 416, a radio frequency circuit (RF Core) 418, and a radio transceiver 420. The transmitter control block 300 and the receiver control block 400 each can be integrated on one chip. There are available chips on the market, which, with programming, can be used to function as the transmitter control block 300 and the receiver control block 400, for example, Broadcom BCM20737S, NXP QN9021, TI CC2540, etc. The functionalities of the circuit blocks shown in FIG. 2 are described below in connection with the flow chart in FIG. 3.

As shown in FIG. 2, the input nodes receive an input voltage Vin. The input nodes are connected to the power amplifier 212, which amplifies the input voltage Vin. The power amplifier 212 is connected to the load demodulator 214, which is connected to the TX matching network 216. The load demodulator 214 demodulates feedback signals transmitted from the load modulator 224 through the coils 208, 206 and RX and TX matching networks 222, 216. The transmission is shown as power-line communication in FIG. 2. The TX matching network 216 is connected to the coil 206. The TX matching network 216 may include one or more capacitors. Capacitance of one or more of the capacitors may be adjustable. The TX matching network 216 and the coil 206 form an LC circuit. The frequency of the LC circuit can be adjusted by adjusting the capacitance of the TX matching network 216. The coil 206 transmits the energy to the coil 208 on the receiver side 204.

On the receiver side 204, similar to the transmitter side 202, the coil 208 is connected to the RX matching network 222, which has one or more capacitors. One or more of the capacitors may have adjustable capacitance. The capacitors are used to adjust the frequency of an LC circuit formed by the coil 208 and RX matching network 222. The RX matching network 222 is connected to the load modulator 224, which is controlled by the receiver control block 400, and generates the feedback signals to be transmitted to the load demodulator 214. The operation of the load modular 224 and the receiver control block 400 will be described in detail below. The load modulator 224 is connected to the rectifier 226, which is connected to the buck converter 228. The energy is received by the coil 208 and transmitted to the rectifier 226, which converts the alternating current (AC) to direct current (DC). The buck converter (e.g., DC-to-DC power converter) 228 steps down the voltage from the rectifier 226 and outputs it to the load 230.

As shown in FIG. 2, the ADC detection circuit 412 of the receiver control block 400 is connected to the positive and negative terminals of the load 230 and to the positive and negative terminals at the input side of the buck converter 228. The ADC detection circuit 412 monitors the output voltage and/or current signals of the rectifier 226 (VRECT and IRECT) and the buck converter 228 (VBUCK and IBUCK), and generates digital signals that are fed to the RX MCU 414. The RX MCU 414 generates control signals based on the digital signals from ADC detection circuit 412. In some embodiments, the control signals correspond to the voltage/current variations of the load 230. The control signals are sent to the load modulator 224 and buck converter 228 through GPIO 416 to control the load modulator 224 and buck converter 228. For example, RX MCU 414 reads VBUCK and IBUCK from ADC detection circuit 412, calculates the current output power, and then calculates the difference between expected output power and current output power. The difference can be defined as a value "output power error", the length of which is one byte. RX MCU 414 will change the GPIO level based on the binary format of "output power error" (1-0 series). As an example, the unit of output power is 100 mW. If the expected output power is 5 W, which is 50*100 mW. The current output power is 4.8 W, which is 48*100 mW. The output power error is 2, the binary format of which is 00000010. To send this one byte value, RX MCU 414 pulls GPIO connected to the load modulator 224 down when it sees a "0", and pulls the GPIO up when it sees a "1".

As discussed above, the ADC detection circuit 412 also monitors VRECT and IRECT. The RX MCU 414 reads the monitored signals and includes them in BLE packet and send them through Bluetooth radio 420 to the transmitter control block 300. The transmitter control block 300 monitors the VRECT and IRECT to make sure they do not exceed certain limits. If they exceed preset limits, the transmitter control block 300 can control the input voltage to lower VRECT and IRECT.

GPIO 416, although shown as one block, may include multiple GPIOs. The RX MCU 414 may use different GPIOs to control load modulator 224 and buck converter 228. For load modulation, the RX MCU 414 may use a GPIO to control one pair of load modulation switches (since the AC currents are positive and negative, so the system uses one pair of switches for AC+ and AC− respectively). When the switch is closed, AC+ or AC− will be connected to GND. When the switch is open, AC+ or AC− is not connected to GND and will supply power to the rectifier 226.

The load modulator 224 modulates the control signals, for example, by applying the control signals to a higher frequency signal. The modulated signals are transmitted through the RX matching network 222 and coil 208 to the transmitter side 202.

The RX MCU 414 may also send the control signals to RF core 418. The RX MCU 414 may also generate signals representing status, e.g., voltage and/or current across the load, and send them to RF core 418. RF core 418 may generate Bluetooth signals and transmit them through radio transceiver 420 to the transmitter side 202. According to some embodiments, the Bluetooth signals are BLE (i.e., Bluetooth version 4.0+) signals and the RF cores and transceivers at the transmitter and receiver sides are configured to send and receive BLE signals.

On the transmitter side 202, the load demodulator 214 receives the feedback signals from the power-line communication (the coil 206 and TX matching network 216), demodulates the feedback signals, and sends the demodulated signals to TX MCU 314 through GPIO 316. The TX MCU 314 also receives the Bluetooth signals from the radio transceiver 320 and RF core 318. The TX MCU 314 generates adjustment signals to the input voltage, and sends it to the ADC detection circuit 312. The ADC detection circuit 312 converts the adjustment signals into analog signals, and applies them to the input voltage. The transmitter control block 300 also detects the input voltage and current through the ADC detection circuit 312.

As described above and shown in FIG. 2, in the embodiments of the present disclosure, there are two communication channels from the receiver side to the transmitter side: (1) BLE communication channel: BLE packets are delivered through the out-of-band 2.4 GHz BLE wireless channel; (2) Power-line communication: power-line packets are delivered through the in-band wireless power transfer channel.

In an exemplary embodiment, the optimization procedure may be initialized by the BLE communication. For example, once the power transmitter side 202 receives the reported charging voltage and current at the receiver side 204, TX MCU 314 calculates the current efficiency and starts tuning input power instantly without waiting for the next BLE packet. During the optimization procedure, the receiver side is constantly reporting the error between received power and expected power through power-line communication. The tuning step is varying based on the efficiency and load condition. The charging efficiency could quickly converge to optimal value while maintaining stable output power. In some exemplary embodiments, the optimization procedure may be terminated by the next BLE packet that the transmitter side 202 receives from the receiver side 204.

Figure 3:
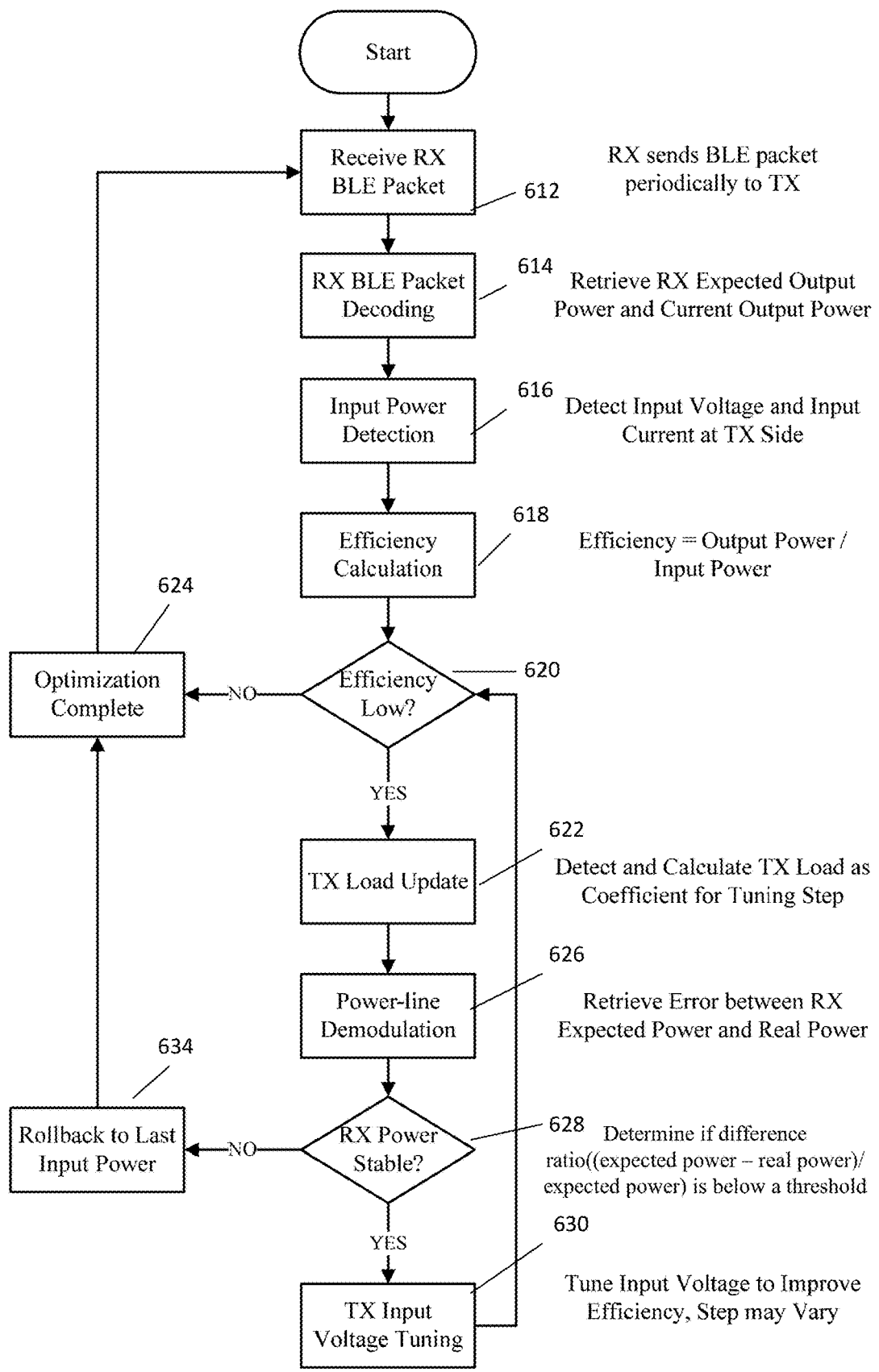
FIG. 3 is a flow chart of a wireless charging process, according to one exemplary embodiment.

FIG. 3 shows a flow chart of an exemplary optimization method. As shown in FIG. 3, after start, the receiver side sends a BLE packet including information on the voltage and current on the load. At step 612, the transmitter side receives the BLE packet. At step 614, the TX MCU decodes the BLE packet and retrieves the information on current output power and expected output power. At step 616, the transmitter control block detects the input voltage and current. At step 618, the transmitter control block calculates the efficiency. The efficiency is output power divided by input power. At step 620, the transmitter control block determines whether the efficiency is low. If the efficiency is low, for example, lower than 55%, the process goes to step 622. If the efficiency is high, for example, 55% or higher, the process goes to step 624, at which, the optimization process ends. At step 622, the TX MCU calculates the transmitter side load (TX load). The TX load can be calculated by dividing the input voltage by the input current ($V_{in}/I$) detected by the ADC detection circuit 312 at the transmitter side. At step 626, the load demodulator demodulates the feedback signals from the power-line communication and sends the demodulated signals to TX MCU. The feedback signals indicate the errors/differences of the expected power and the real power across the load. The expected power can be set by the user. For example, if the charging system is used to charge a smartphone, the expected power may be set as 5 W. At step 628, TX MCU determines whether difference ratio ((expected power−real power)/expected power) is below a threshold. If no, the TX MCU will adjust the input voltage to the last input voltage $V_{in,prev}$ at step 634. If yes, the TX MCU will generate adjustment signals to adjust the input voltage to be $V_{in,\ new}$ (calculated by the formulas below).

The tuning step $\Delta V$ at the transmitter side is determined by three parameters: (1) the difference between current efficiency and target efficiency $e_\eta$ (unit is %), (2) load condition of the receiver side and coil system $Z_L$ (unit is Ω), (3) RX power error coefficient $C_{ep}$, which is determined by the error between expected RX power and real output power $e_P$.

$$C_{ep} = \begin{cases} 1, e_P < 100 \text{ mW} \\ 2, e_P < 200 \text{ mW} \\ RX \text{ Power Unstable, otherwise} \end{cases}$$

If $e_P \geq 200$ mW, which means the output power variation is more than 200 mW compared with expected value, TX MCU will assume RX output power is unstable, and thus roll back to last input voltage and terminate optimization.

The tuning of input voltage in each iteration can be expressed in the following equation:

$$\begin{cases} \Delta V = k \dfrac{Z_L - Z_{L,min}}{Z_{L,max} - Z_{L,min}} \dfrac{e_\eta}{C_{ep}} + \Delta V_{min} \\ V_{in,new} = V_{in,prev} - \min\{\Delta V, \Delta V_{max}\} \end{cases}$$

Where final value $V_{in,new}$ is the newly determined input voltage in this tuning iteration, $V_{in,prev}$ is the previous input voltage in last tuning iteration, $\Delta V_{max}$ is the maximum tuning step defined by user, $\Delta V_{min}$ is the minimum tuning step defined by user. $Z_L$ is TX load. $Z_{L,max}$ is the maximum TX load in wireless charging system, $Z_{L,min}$ is the minimum TX load in wireless charging system. k is the coefficient to determine the impact of three parameters $e_\eta$, $e_P$ and $Z_L$. k is the coefficient to determine the impact of three parameters $e_\eta$, $C_{ep}$ and $Z_L$. If k is larger, the input voltage will be reduced faster. Typical values for coefficient k is 250~350. For example, in a wireless power transfer system, whose $Z_{L,min}$ is 5Ω and $Z_{L,max}$ is 60Ω, the target efficiency is 50%. In this system the coefficient k is set to 290. Power receiver target output power is 5 W. When input voltage is 20V, the input current is 0.9 A, so $Z_L$=22.2Ω, currently the RX output power is 4.95 W, current efficiency is 27.5%, from equation shown above, and the voltage tuning step is 2244 mV. When input voltage is reduced to 14V, the input current is 0.8 A, so $Z_L$=17.5Ω, the RX output power is 4.92 W, current efficiency is 43.9%, from equation shown above, and the voltage tuning step is 435 mV. As shown in the above calculations, the voltage tuning will be smaller when efficiency is close to optimal efficiency (50%).

The parameters k, $\Delta V_{min}$, $\Delta V_{max}$, $Z_{L,min}$, and $Z_{L,max}$ can all determined by user's requirements. These are design parameters that can be determined based on the charging system condition and are related to the charging area, charging distance, voltage rating, TX Coil shape etc. These values can be tuned during system tests to achieve best performance to meet user's requirement.

Figure 4:
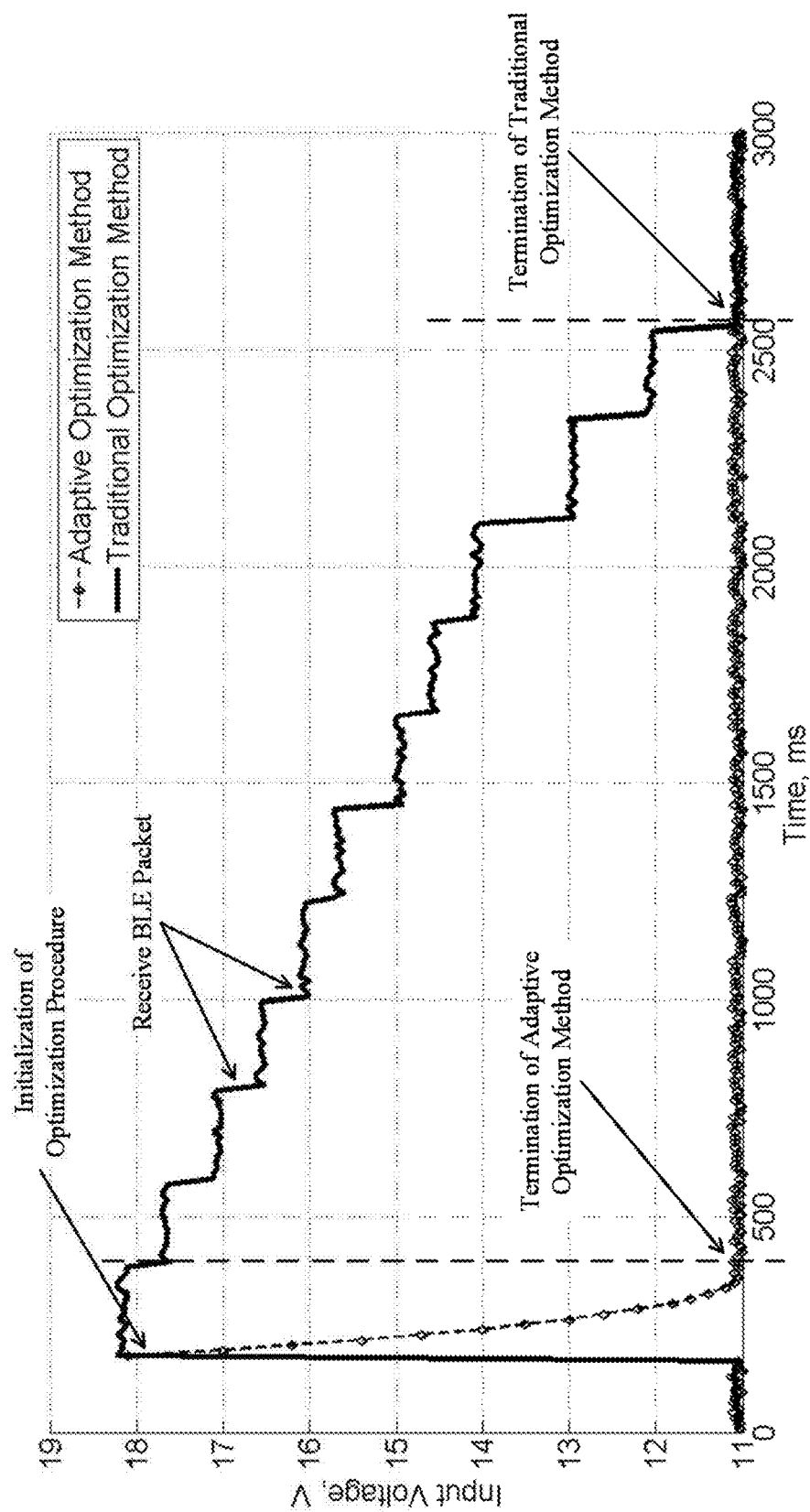
FIG. 4 is diagram of comparison results between a conventional wireless charging method and an embodiment of the present disclosure.

FIG. 4 shows a comparison of efficiency optimization speed between adaptive optimization method and traditional optimization method. As shown in FIG. 4, traditional optimization method uses BLE signals, which have a frequency of 2.4 GHz and are sent in a time interval of 200 milliseconds (ms), to adjust the input power. The embodiments in this disclosure additionally use power-line signals, which have a frequency of 6.78 MHz (or another frequency between 50 kHz to 10 MHz), and are sent at a much higher frequency, for example, at intervals, e.g., 20 ms. Thus, the system in this disclosure can quickly adjust the output power to an expected level. As an example, known that the optimal input voltage is 11V to achieve maximum efficiency, when power receiver is moved to another place that triggers the input voltage to 18V, two methods initialize optimization procedure at the same time to reduce input voltage and improve efficiency. For the traditional optimization method, it requires around 2400 ms to terminate optimization procedure and reduce input voltage to 11V, while the adaptive optimization method takes only around 200 ms to reach optimal efficiency condition. In addition, the adaptive optimization method is monitoring the stability of RX output power in real time while tuning the input power. If RX output power has large variation or drops under expected value, the input voltage will roll back to last stable level to ensure the stability of wireless charging performance.

The present disclosure introduces an adaptive efficiency optimization method for wireless charging systems, which can be used to improve the overall system efficiency in a fast and reliable approach. By adaptively tuning the input power and real-time output power monitoring, the wireless charging system can optimize the efficiency under different load condition at a faster speed. In some exemplary embodiments, the adaptive efficiency optimization method can be fully implemented by software, so it will not increase the circuit cost of product. In addition, this optimization method can be adopted to different charging scenarios by changing the pre-defined parameters to satisfy different types of requirements.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A method for adaptively optimizing wireless charging efficiency, comprising:
providing an input power to a power transmitter, the power transmitter comprising a transmitter-side coil wirelessly coupled to a receiver-side coil of a power receiver;
determining, at the power receiver, a real power transferred from the power transmitter;
transmitting, to the power transmitter, status information including at least one of a voltage or a current associated with the real power through Bluetooth;
transmitting, to the power transmitter, feedback information including a difference between the real power and an expected power corresponding to the input power through power-line communication, wherein the power-line communication is conducted through the coupling between the receiver-side coil and the transmitter-side coil; and
adjusting, at the power transmitter, the input power in response to determining, according to the feedback information, that the real power differs from the expected power by over a first threshold, causing the real power to tune towards the expected power.

2. The method of claim 1, wherein:
the power transmitter further comprises one or more adjustable capacitors coupled to the transmitter-side coil to form a frequency-adjustable transmitter LC circuit; and
the power receiver further comprises one or more adjustable capacitors coupled to the transmitter-side coil to form a frequency-adjustable receiver LC circuit.

3. The method of claim 1, wherein the feedback information is 1 byte in length.

4. The method of claim 1, wherein the feedback information is transmitted between 50 kHz to 10 MHz.

5. The method of claim 1, further comprising:
determining, at the power receiver, a coupling efficiency between the power transmitter and the power receiver, the coupling efficiency associated with the real power and the expected power;
transmitting efficiency information comprising the coupling efficiency to the power transmitter through power-line communication; and
adjusting, at the power transmitter, the input power in response to determining, according to the efficiency information, that the coupling efficiency differs from an optimal coupling efficiency by over a second threshold, causing the coupling efficiency to change towards the optimal coupling efficiency.

6. The method of claim 1, wherein:
the power transmitter further comprises a transmitter control block, the transmitter control block not comprising the transmitter-side coil, and the power receiver further comprises a receiver control block, the receiver control block not comprising the receiver-side coil, and
the method further comprising transmitting the status information from the receiver control block to the transmitter control block through Bluetooth.

7. The method of claim 6,
further comprising tuning, by the transmitter control block, the input power, in response to determining at least one of the voltage exceeding a voltage threshold or the current exceeding a current threshold, causing at least one of:
the voltage dropping below the voltage threshold or the current dropping below the current threshold.

8. The method of claim 1, wherein transmitting the feedback information through power-line communication is substantially more frequently than transmitting the status information through Bluetooth.

9. A system for adaptively optimizing wireless charging efficiency, comprising:

a power transmitter configured to receive an input power, the power transmitter comprising a transmitter-side coil wirelessly coupling to a receiver-side coil; and a power receiver comprising the receiver-side coil and configured to:
  determine a real power transferred from the power transmitter;
  transmit, to the power transmitter, status information including at least one of a voltage or a current associated with the real power through Bluetooth; and
  transmit, to the power transmitter, feedback information including a difference between the real power and an expected power corresponding to the input power through power-line communication, wherein the power-line communication is conducted through the coupling between the receiver-side coil and the transmitter-side coil,
wherein the power transmitter is further configured to adjust the input power in response to determining, according to the feedback information, that the real power differs from the expected power by over a first threshold, causing the real power to tune towards the expected power.

10. The system of claim 9, wherein:
the power transmitter further comprises one or more adjustable capacitors coupled to the transmitter-side coil to form a frequency-adjustable transmitter LC circuit; and
the power receiver further comprises one or more adjustable capacitors coupled to the transmitter-side coil to form a frequency-adjustable receiver LC circuit.

11. The system of claim 9, wherein the feedback information is 1 byte in length.

12. The system of claim 9, wherein the feedback information is transmitted between 50 kHz to 10 MHz.

13. The system of claim 9, wherein:
the power receiver is further configured to:
  determine a coupling efficiency between the power transmitter and the power receiver, the coupling efficiency associated with the real power and the expected power, and
  transmit efficiency information comprising the coupling efficiency to the power transmitter through power-line communication; and
the power transmitter is further configured to adjust the input power in response to determining, according to the efficiency information, that the coupling efficiency differs from an optimal coupling efficiency by over a second threshold, causing the coupling efficiency to change towards the optimal coupling efficiency.

14. The system of claim 9, wherein:
the power transmitter further comprises a transmitter control block, the transmitter control block not comprising the transmitter-side coil; and
the power receiver further comprises a receiver control block configured to transmit the status information to the transmitter control block through Bluetooth, the receiver control block not comprising the receiver-side coil.

15. The system of claim 14, wherein:
the transmitter control block is configured to tune the input power, in response to determining at least one of the voltage exceeding a voltage threshold or the current exceeding a current threshold, causing at least one of:
  the voltage dropping below the voltage threshold or the current dropping below the current threshold.

16. The method of claim 14, wherein the feedback information transmitted through power-line communication is transmitted substantially more frequently than the status information transmitted through Bluetooth.

* * * * *